Dec. 18, 1956 E. J. BERNET 2,774,940
AUTOMATIC EVALUATOR
Filed April 17, 1951
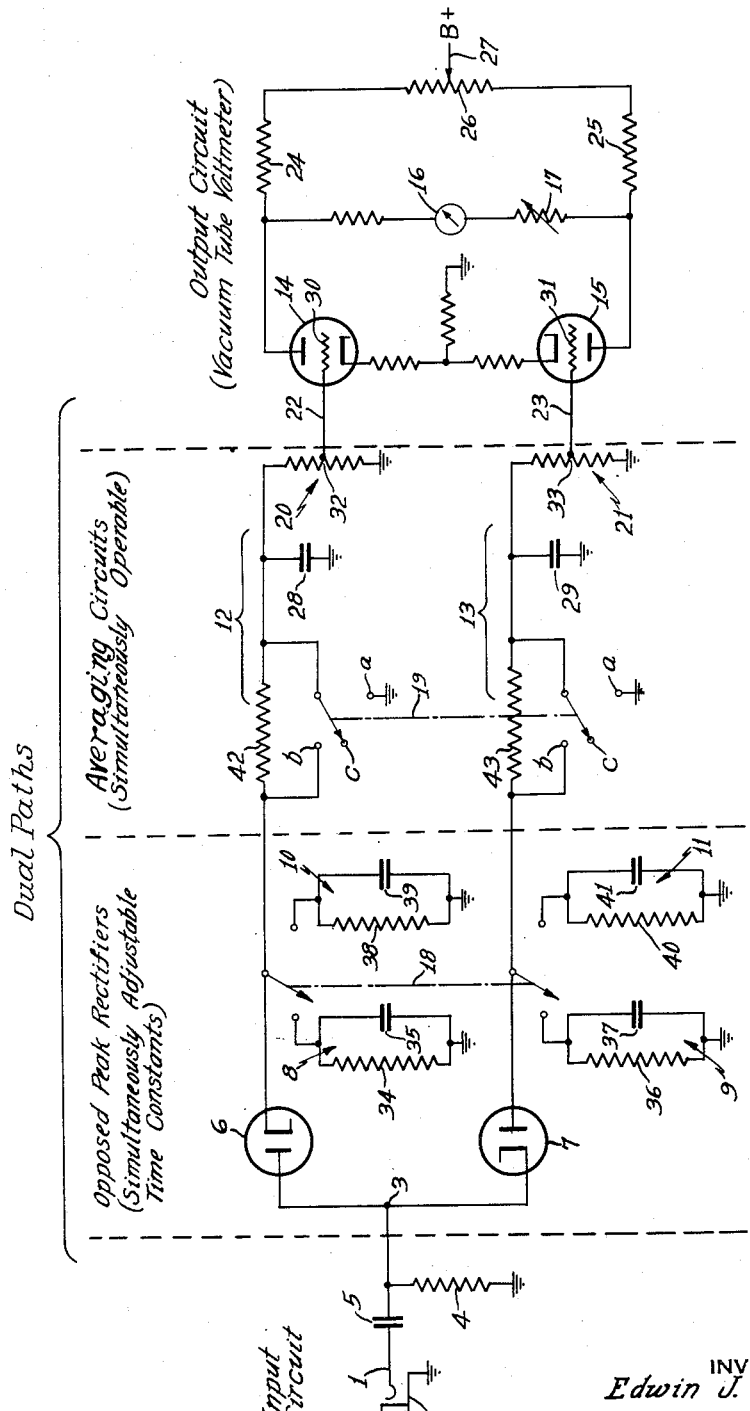
INVENTOR
Edwin J. Bernet
BY
ATTORNEYS

United States Patent Office 2,774,940
Patented Dec. 18, 1956

2,774,940

AUTOMATIC EVALUATOR

Edwin J. Bernet, Charlottesville, Va., assignor to Institute of Textile Technology, Charlottesville, Va., a corporation of Virginia Application April 17, 1951, Serial No. 221,509

11 Claims. (Cl. 324—102)

This invention relates to the rapid evaluation of the uniformity of pulsating electrical potential which, for example, may correspond to variations in the characteristics of material of continuous length. The invention is especially applicable to the automatic indication of the degree of uniformity of the weight per unit length or the diameter of yarn or the like, as it moves through a test apparatus.

Several devices have been developed which translate variations in physical characteristics of a material, such as changes in weight per unit length, into electric impulses of correspondingly changing magnitude. Some of these have provision for a recording device by which the fluctuations may be graphically recorded. Although this offers a permanent record of the variation it does not give an immediate evaluation of uniformity or non-uniformity.

Making use of such records, an approximate figure of merit or numerical value of the non-uniformity can be obtained by calculating the standard deviation of a group of random points read from the graph. A simpler calculation of the non-uniformity can be made in the case of yarn by dividing the material into segments of a given length (e. g., 1 foot, 10 feet, or 100 feet) and reading the high and low points in each segment. Then the highs are everaged to give $H_{av}$ and the lows are averaged to give $L_{av}$ and the percent non-uniformity is then calculated as $$\frac{H_{av}-L_{av}}{\frac{1}{2}(H_{av}+L_{av})}\times 100$$

However, even this simplified calculation may take several hours when measuring lengths of a thousand feet of material or more. It is necessary to test these relatively long lengths if one is to get a good measure of the uniformity of the product, since it has been found by experience that materials commonly show variations having periodicities ranging from a few inches to several hundred feet, and a significant average cannot be obtained unless relatively long lengths are tested.

By means of the present invention, not only is the degree of uniformity immediately indicated, but the effective length of segment over which the degree of uniformity is indicated at any instant may be varied as desired, as will appear hereinafter. By merely taking several readings at regular intervals over a short period of time and averaging these readings, an extremely accurate and quick evaluation of uniformity for the entire length may be obtained. This is accomplished by making use of any suitable electric impulses, for example those heretofore referred to as having been used for producing a graphical record. The nature of the present invention will be better understood from the following explanation.

The varying electrical impulses, above referred to, consist of pulsating current having minimums and maximums, which for convenience may be referred to as inward and outward peaks. These may in themselves comprise alternating current (A. C.) or may be the A. C. component of a pulsating direct current (D. C.). The system disclosed in my copending application for U. S. Letters Patent Ser. No. 77,744, filed February 23, 1949, Patent No. 2,576,772, granted November 27, 1951 produces a pulsating direct current of a nature suitable to effect the automatic evaluation of the present invention. If such an input signal be employed, the varying component, namely the inward and outward peaks, is separated from the D. C. component, thereby securing an alternating current with positive and negative portions corresponding to the inward and outward peaks, respectively. The inward and outward peaks of this A. C. component are rectified separately, using peak rectifiers which, as will be pointed out, should have adjustable time constants. One of the rectified A. C. portions will correspond to the peaks indicating maximum values above average, such as weight per unit length. The other rectified portion will correspond to the below average minimums. By changing the time constants of both rectifiers similarly and simultaneously, the action of the rectifiers may be adjusted to the frequency with which the variations occur and also to their magnitude, so that the rectifier outputs will correspond either to infrequently occurring maximums and minimums or will follow the lesser variations in-between. The time constants of the rectifiers are dependent upon their associated RC networks. The charge imposed upon the capacitive element by a peak in the input, leaks off more slowly, as the product of the resistance multiplied by the capacitance increases. The opposite effect is had by decreasing the time constant. The duration of input over which the peaks are sensed can be shortened or lengthened by changing the time constants of the system, and since that period of input represents the characteristics of a definite length of material under test, the time constants of the system are related to and determinative of the segment length over which peaks are sensed.

The output of each of the two rectifiers will thus have a varying characteristic corresponding to one of the variations. In order to secure a value indicating uniformity or non-uniformity each of these variations is integrated or, more correctly, is averaged by passing through an integrating or averaging filter circuit which smooths the output of its associated rectifier.

The total range of variation from outward maximum to inward maximum, namely, the departure from uniformity, is measured by connecting a double triode type of vacuum tube voltmeter across the two output circuits from the two averaging circuits. This will give a direct reading of non-uniformity or uniformity for the selected length of material, and may be continuous or intermittant as may be desired.

The effective length over which values are indicated can also be altered, without changing the time constant, by changing the speed of the material being tested. It should be noted that each length over which the maximum voltage is read is not a discrete segment, but it is a continuously moving, or sensitive length, since it is measured by the product of the speed of the material and the time-constant of the diode circuits. The effects of all past fluctuations continue to some extent, but those peaks which occurred in a length which went through the instrument at a past time greater than the time constant of the circuit may be considered to have a negligible effect on the reading at any given instant.

Reference to the accompanying drawing will aid in a more complete understanding of this invention, its use, and its operation.

The drawing is a schematic diagram of the electrical system in a preferred embodiment of the evaluator. For purposes of explanation the preferred embodiment of this invention may be considered as being composed of several major basic circuits, as shown. These comprise an input circuit and an output circuit connected by two current paths, each of which includes a peak rectifier and an averaging circuit. The details and the functions of the elements within each of these circuits will be apparent from the following explanation of the overall operation of the system which traces the path of the input stage-by-stage to its termination in a reading of uniformity.

In use, the input circuit of the evaluator would be connected at its input terminal 1 and grounded terminal 2 to the output of a uniformity analyzer, for example, such as that disclosed in my mentioned Patent No. 2,576,772. As previously stated, the output of such an analyzer is a fluctuating or pulsating direct current which can be separated into an A. C. component and a D. C. component, the D. C. representing uniformity of the material under test and the A. C. representing the non-uniform changes of the material. Other signal sources of pulsating or of alternating current may be employed. Since a measure of the degree of uniformity is concerned only with the changes or variance from perfect uniformity, only the A. C. component of the input signal is significant to the evaluator. Accordingly, in the assumed example, a D. C. blocking condenser 5 is provided in the input circuit and connected in series to the input terminal 1. If the input signal includes no D. C. component, this condenser is not required. Condenser 5 is of such value as will block all D. C. and allow substantially all the A. C. to pass. Any equivalent component such as a transformer of suitable characteristics could be substituted for the condenser.

From a common terminal 3, the system divides into two current paths. Rectifying means 6 and 7 are connected to terminal 3 to receive the A. C. passed by the condenser 5. The rectifying means 6 and 7 may be in a common envelope such as a duo-diode tube of the 6H6 type. These are connected in opposition with respect to polarity, the anode of diode 6 and the cathode of diode 7 connecting at the common terminal 3. The remaining electrode in each diode is connected, through its load, to ground. A resistor 4 is connected in parallel with the diodes and is grounded so that the A. C. potentials which appear across this resistor are impressed on diodes 6 and 7. This parallel resistor 4 is large enough to prevent any appreciable flow of current through it to ground. A high impedance secondary winding of the mentioned transformer would have a similar function. Because diodes 6 and 7 are connected in opposed polarity and permit only uni-directional flow, each rectifies one portion of the A. C. imposed upon it, diode 6 passing the positive portion and blocking the negative portion of the A. C., while diode 7 passes the negative portion and blocks the positive portion of the A. C.

Each of the rectified outputs of the diodes 6 and 7 is in itself a pulsating D. C., and the parallel-shunt RC networks 8 and 9 in each of the current paths, respectively, effectively ride the peaks of the wave form and have large enough time constants to retain most of the charge between peaks. The resistive elements 34 and 36 of the RC parallel networks should be of the same order of magnitude as resistor 4 which is connected in parallel with each of them on alternate portions of the A. C. component. Alternate RC networks 10 and 11 provide a different time constant so that the length of segment of material over which the peaks of non-uniformity are sensed may readily be altered through gang switch 18, while the speed at which the material passes through the test apparatus remains unchanged. This arrangement gives a reading over an effectively smaller segment of the peaks of non-uniformity in the material under test as the time constant is decreased. As the time constant is increased, the reading represents the average of the peaks over a longer segment. Additional RC networks or variable resistive and capacitive elements may be provided to give further adjustment of time constants. The time constants employed simultaneously in the upper and lower paths should be the same.

RC averaging filters 12 and 13 are arranged and selected with respect to time constants so as to average and smooth out the voltage from the respective preceding RC networks in order to facilitate indications on the meter. A gang switch 19, having three positions a, b, c, is provided. At a first position a of switch 19 both current paths are simultaneously grounded, preferably at the junction of resistor 42 and condenser 28 and at the junction of resistor 43 and condenser 29, to dissipate any charges on these condensers and to block input potential from the vacuum tube voltmeter circuit. At position b resistors 42 and 43 are by-passed to allow each of condensers 28 and 29 to charge up more quickly in the beginning of a run, assuring that the averaging filters are functioning fully and that a reliable reading may be had without a further waiting period. Position c is neutral, e. g., at this position the averaging filters operate in their normal manner. Thus, the readings are taken at position c of switch means 19.

The smoothed and averaged peak potential of the positive branch of the circuit appears across a resistor 20, and of the negative branch across a resistor 21. These resistors are respectively connected by leads 22 and 23 to the input circuit of a vacuum tube voltmeter. Such input circuit here comprises the grids 30, 31 of two amplifier tubes 14 and 15, respectively, which may also be in a common envelope, such as of a 6SN7 type tube. These tubes offer a high input impedance and represent practically no load to their input circuit so that there is a minimum of reaction and disturbance to the portion of the system on their input side. When one of the amplifiers has a negative potential applied to its grid and the other a positive potential applied to its grid, they pass currents of different magnitudes. The resistance values of the portions of resistors 20, 21 above and below the taps 32 and 33, respectively, will depend on the grid/anode characteristics of the tubes 14, 15, the range of input voltages, the anode voltage, etc., and should be chosen or adjusted so that signal variations impressed on the grids will not be distorted.

A suitable meter 16 is connected across the outputs of the amplifiers and responds to an absolute voltage difference representing the difference in amplifier output currents. The difference in currents is proportional to the difference between the positive and negative peaks due to non-uniformity of the material being tested. This meter may be calibrated in percentage of uniformity or non-uniformity, one scale being the converse of the other. A variable resistance 17 is connected in series with the meter 16 so that different degrees of sensitivity may be had by changing the amount of resistance in series with the meter and thus altering the range of full scale deflection. The variable resistor 17 may be replaced by any of the well-known equivalents such as a multiplicity of fixed or variable (or both) resistors selectively connectible to meter 16 by a suitable multipoint switch.

Fixed load resistors 24 and 25 of appropriate value are included in the output circuits of the amplifiers to limit the current drawn. Movable tap 27 on resistor 26 affords a means for adjusting meter 16 to zero. Resistor 26 may be considered as being divided into two parts at its adjustable tap 27. One part is in series with the output circuit of one amplifier and the remaining part is in series with the output circuit of the other amplifier, both having the B+ voltage impressed upon them. When the position of the tap is varied, the portion of resistive load on one amplifier is increased, reducing the amount of current through it. The opposite result is simultaneously effected in the other amplifier, the amount of its resistive load being reduced by the same amount as the first was increased. By observing the meter 16 and adjusting the variable tap 27 of resistor 26 the same amount of current can be made to flow through each amplifier and the meter will read zero.

To enable those skilled in the art to practice the invention, the following approximate values of circuit elements are given as typical. Circuit elements of these values gave an accuracy of 1% in testing the uniformity of yarn measured at the rate of five feet per second, in one embodiment. Obviously the values will differ depending upon the type of test being conducted, the degree of accuracy desired, and the characteristics of the interrelated elements.

Resistors:
4 _____ 1 megohm, ±20%.
34, 36, 38, 40 __ 1.5 megohms, ±10%.
42, 43 _____ 4.7 megohms, ±10%.
20, 21 _____ 16.8 megohms, (tap 6.8 megohms from ground), ±20%.

Capacitors:
5 _____ 10 mfd., ±20%.
35, 37 _____ 0.1 mfd., ±10%.
28, 29, 39, 41 __ 1 mfd. ±10%.

The proper value of signal strength needed to complement the calibration of the evaluator may be ascertained through results experienced with materials of different ranges of dimensions. As, for instance, in the textile field, the materials tested may range through yarn, roving, and sliver, each requiring an appropriate signal strength.

From the foregoing description it can be seen that if material being tested is perfectly uniform the output of the test apparatus will be unvarying, viz., will be wholly D. C., there being no change in the material and consequently no fluctuation in the electrical output. Under these conditions, the evaluator will have no A. C. input, and since the D. C. is blocked by a condenser, the circuit of the evaluator is not actuated. The meter will then read zero percent non-uniformity, or one hundred percent uniformity, depending on its calibration.

When the material under test is not perfectly uniform, the input to the evaluator will have an A. C. component of which the peak-to-peak value represents the disparity from uniformity. The amplifiers in the circuit of the present invention are controlled by peak-riding current paths, one positive and the other negative, and each amplifier has an output dependent upon both the polarity and the magnitude of the potential applied to its grid. Thus, even if the positive and negative peaks are of equal magnitude, the peak-to-peak value is indicated because of the opposite polarities of the potentials applied to the grids of the amplifiers.

It is possible that the average, or R. M. S., values of the A. C. component of input to the evaluator will remain almost constant over a particular segment under measurement, while the peak-to-peak values change radically over the same segment. This is so because the A. C. envelope produced by a typical test apparatus is not symmetrical, and the irregularities of wave form need not conform to any definite pattern. Under these conditions, an evaluator which bases its measurement upon average or R. M. S. values of the input wave will indicate a much greater degree of uniformity than is actually present in the material being tested. The system of the present invention, however, will faithfully reflect the degree of uniformity regardless of average or R. M. S. values of the input, because its two branches are oppositely poled and peak riding in character, therefore sensing the peak-to-peak disparity from uniformity of the positive fluctuations and the negative fluctuations separately and independently. From this it will be understood that because of the irregularity of both the positive and negative wave forms, the means value is constantly fluctuating, and therefore that the system as a whole must operate in dependently of means values. In addition, the choice of time constants, quickly and easily changed, gives the system the facility and flexibility necessary to readily evaluate the uniformity of different lengths of material over a wide range.

In evaluating different materials of unpredictable and diverse uniformity characteristics, the necessity for dealing with the peaks of non-uniformity and measuring the irregular envelope enclosed by those peaks is essential if a reliable evaluation is to be obtained. Measuring the peaks of non-uniform characteristics provides increased sensitivity because the maximums are sensed; relating the measured positive peaks to the negative peaks and using the peak-to-peak values achieves a true reproduction of characteristics regardless of the unsymmetrical form of the A. C. component of the input of the evaluator, and in fact enhances the degree of sensitivity, rather than sacrificing it.

Basing its measurements and evaluation upon the extremes of the variance from uniformity, the present invention is in its concept and executed embodiment an inherently more exact and accurate uniformity indicator than those known heretofore.

It is understood that forms and means other than those herein described in connection with a preferred embodiment may be used without departing from the spirit of the invention or its basis of operation.

I claim:

1. In a system for automatically and continuously evaluating the uniformity of an electrical potential having positive and negative components subject to variation over a limited frequency range, an input terminal adapted to be connected to a source of said electrical potential, two rectifier means having input electrodes of opposite polarity connected in common to said input terminal and output electrodes of opposite polarity, first and second similar resistances one each connected between one of said output electrodes and ground, first and second similar condensers one each connected in shunt to one of said resistances, whereby each resistance and its shunt condenser comprises a similar time constant circuit and each rectifier and its associated time constant circuit comprises means for respectively rectifying the positive and negative peaks of said components substantially independently of frequency variations within said frequency range, first and second output impedances, third and fourth resistances one each connected between the ungrounded end of one of said first and second resistances and one of said impedances, respectively, a third condenser connected between ground and the junction of said third resistance and said first impedance, a fourth condenser connected between ground and the junction of said fourth resistance and said second impedance, said third and fourth resistances being similar and said third and fourth condensers being similar, said third resistance and condenser and said fourth resistance and condenser being proportioned to separately average the positive and negative peaks, respectively, and means connected to said impedances for continuously measuring the total potential across the averaged positive and negative peaks.

2. A system adapted to evaluate continuously an electrical input potential having inward and outward fluctuations corresponding to variations in a characteristic per unit length of elongated material, including an input circuit comprising a series capacity and a grounded impedance connected to a terminal and being adapted to pass to said terminal only components representing said fluctuations so as to form from said fluctuations corresponding voltages of opposite polarity with respect to ground, two output circuit impedances each connected to ground, two similar parallel paths connecting said input circuit separately to said output impedances, respectively, two oppositely poled half-wave rectifiers connecting the terminal of said input circuit to each of said paths, respectively, so that one of said paths transmits only inward fluctuations and the other of said paths transmits only outward fluctuations from said input terminal, two sets of substantially identical time-constant circuit elements similarly connected one set to each path, respectively, and to each rectifier, respectively, to render the respective rectifiers responsive to fluctuation peaks only, each set of said elements having the same time constant which determines the length of the segment of material of which the uniformity is to be measured, averaging means connected in each path between said time-constant circuit elements and said output impedances for independently averaging inward and outward peaks, the averaging means in each path comprising a resistive element connected in series in the path and a capacitive element connected in shunt to the path and switching means connectible to said resistive element and to ground, simultaneously operable in both paths, respectively, to connect both paths to ground whereby to discharge said condensers, or to by-pass said resistance whereby to permit rapid charge of said condensers, or to remain disconnected whereby said resistors and capacitors are connected as an averaging filter, each said output impedance having an output terminal, and a vacuum tube voltmeter of the push-pull type connected in said output circuit which includes two grids symmetrically connected to said output impedances so that said voltmeter is actuated by the potential across said output terminals, whereby the degree of uniformity of said input potential, and hence of said variations, is automatically evaluated.

3. A system adapted to evaluate continuously an electrical input potential having inward and outward fluctuations corresponding to variations in a characteristic per unit length of elongated material, including an input circuit comprising a series capacity and a grounded impedance connected to a terminal and being adapted to pass to said terminal only components representing said fluctuations so as to form from said fluctuations corresponding voltages of opposite polarity with respect to ground, two output circuit impedances each connected to ground, two similar parallel paths connecting said input circuit separately to said output impedances, respectively, two oppositely poled half-wave rectifiers connecting the terminal of said input circuit to each of said paths, respectively, so that one of said paths transmits only inward fluctuations and the other of said paths transmits only outward fluctuations from said input terminal, two sets of substantially identical time-constant circuit elements similarly connected one set to each path, respectively, and to each rectifier, respectively, to render the respective rectifiers responsive to fluctuation peaks only, each set of said elements having the same time constant which determines the length of the segment of material of which the uniformity is to be measured, averaging means connected in each path between said time-constant circuit elements and said output impedances for independently averaging inward and outward peaks, the averaging means in each path comprising a resistive element connected in series in the path and a capacitive element connected in shunt to the path, and switching means connected to both ends of said resistive element and to ground and having positions for grounding the path, for by-passing the resistor and alternatively for remaining in open circuit with respect to said averaging means, and uni-control means operatively connecting the switching means associated with both paths, each said output impedance having an output terminal, and a vacuum tube voltmeter of the push-pull type in said output circuit which includes two grids symmetrically connected to said output impedances so that said voltmeter is actuated by the potential across said output terminals, whereby the degree of uniformity of said input potential, and hence of said variations, is automatically evaluated.

4. A system adapted to evaluate continuously an electrical input potential having inward and outward fluctuations corresponding to variations in a certain characteristic per unit length of elongated material, including an input circuit having a terminal and being adapted to pass only said fluctuations, an output circuit, two parallel paths connecting said input circuit separately to said output circuit, two oppositely poled half-wave rectifiers connecting the terminal of said input circuit to each of said paths, respectively, so that one of said paths transmits only inward fluctuations and the other of said paths transmits only outward fluctuations from said input terminal, two sets of substantially identical time-constant circuit elements similarly proportioned and connected one set to each path, respectively, to render the respective rectifiers responsive to fluctuation peaks only, each set of said elements having the same time constant which determines the length of the segment of material of which the uniformity is to be measured, means for simultaneously adjusting the time constants of both said paths so as to change the effective length of the segments being measured, averaging means connected in each path for independently averaging inward and outward peaks, an output impedance connected at the termination of each path, each output impedance having an output terminal, and a vacuum tube voltmeter of the push-pull type in said output circuit connected to be actuated by the potential across said output terminals, whereby the degree of uniformity of said fluctuating potential, and hence of said variation, is automatically evaluated.

5. A system adapted to evaluate continuously an electrical input potential having inward and outward fluctuations corresponding to variations in a characteristic per unit length of elongated material, including, an input circuit comprising a series capacity and a grounded impedance connected to a terminal and being adapted to pass to said terminal only components representing said fluctuations so as to form from said fluctuations corresponding voltages of opposite polarity with respect to ground, two output circuit impedances each connected to ground, two similar parallel paths connecting said input circuit separately to said output impedances, respectively, two oppositely poled half-wave rectifiers connecting the terminal of said input circuit to each of said paths, respectively, so that one of said paths transmits only inward fluctuations and the other of said paths transmits only outward fluctuations from said input terminal, two sets of substantially identical time-constant circuit elements similarly connected one set to each path, respectively, and to each rectifier, respectively, to render the respective rectifiers responsive to fluctuation peaks only, each set of said elements having the same time constant which determines the length of the segment of material of which the uniformity is to be measured, averaging means connected in each path between said time-constant circuit elements and said output impedances for independently averaging inward and outward peaks, each said output impedance having an output terminal, and a vacuum tube vltometer of the push-pull type in said output circuit which includes two grids symmetrically connected to said output impedances so that said voltmeter is actuated by the potential across said output terminals, whereby the degree of uniformity of said input potential, and hence of said variations, is automatically evaluated.

6. A system for automatically evaluating the uniformity of an electrical signal having random variations representing changes in characateristics of an elongated material under test, which includes means producing from said variations positive and negative voltage portions, two peak rectifiers connected in separate similar time-constant circuits, respectively, each time-constant circuit comprising resistance and capacitance connected parallel-shunt with respect to the rectifier and ground and proportioned and arranged to rectify the positive and negative portions of said variations with respect to a common predetermined time constant which is remote from the occurrence frequency of said variations, said time constant being selected to represent a predetermined segment length of material greater than the usual distance between successive variations in material, two averaging means connected to average said rectified portions separately, two impedance elements of constant value connected to said averaging means, respectively, across each of which is established a potential corresponding to a respective one of said integrated portions, said last-named potentials being of opposite sign and vacuum tube voltmeter means for measuring the difference between said last-named potentials.

7. A system for automatically and continuously evaluating uniformity of an electrical potential having random variations of amplitude and frequency of occurrence and therefore of constantly changing mean, which includes a plurality of rectifier means proportioned and arranged to be separately and selectively responsive to the outward and inward peaks of said variations but substantially unresponsive to frequency variations thereof, means for independently averaging the outward and inward peaks of said variations, means for deriving a first averaged potential from said outward peaks only, means for deriving a second, averaged potential from said inward peaks only, said averaged potentials being of opposite sign, means establishing two currents, a plurality of separate means respectively responsive to said first and second potentials for controlling said currents, respectively, and for establishing a potential from each controlled current and means for measuring the difference between said last-named potentials.

8. In a system for automatically and continuously evaluating the uniformity of an electrical potential having positive and negative component peaks subject to random and dissimilar variation in frequency of occurrence, two peak rectifier means including two similar time-constant circuits each comprising parallel resistance and shunt capacitance connected from ground to an output electrode of one of said rectifier means, respectively, proportioned and arranged to separately rectify the positive and negative peaks of said components substantially independently of the frequency of occurrence thereof, two sets of similar averaging means connected to the output of said rectifier means, respectively, for independently averaging said positive and negative peaks, separate impedance means across which potentials of opposite sign and of values representative of the averaged positive and negative peaks are respectively established, and means connected to said impedances for continuously measuring the total potential across the averaged positive and negaitve peaks.

9. In a system for automatically and continuously evaluating the uniformity of an electrical potential having positive and negative component peaks subject to random variation in frequency of occurrence over a certain range, two oppositely poled peak rectifier means including two similar time-constant circuits each comprising parallel resistance and capacitance elements proportioned and arranged to separately rectify the positive and negative peaks of said components substantially independently of the frequency of occurrence thereof, two sets of similar averaging means each comprising series resistance and parallel capacitance elements connected to the output of said rectifier means, respectively, for independently averaging said positive and negative peaks, separate impedance means across which potentials of values representative of the averaged positive and negative peaks are respectively established, and means connected to said impedances for continuously measuring the total potential across the averaged positive and negative peaks.

10. A system for automatically evaluating the uniformity of an electrical signal having random maximum and minimum variations of random frequency of occurrence representing changes in characteristics of an elongated material under test, which includes means producing from said variations corresponding positive and negative voltage portions respectively, two oppositely poled peak rectifiers, two separate similar time-constant circuits connected from ground to an output electrode of one of said rectifiers, respectively, for rectifying said positive and negative portions, respectively, said time-constant circuits being proportioned and arranged to have a time constant considerably greater than that representative of the usual occurrence frequency of successive variations in said material, means for simultaneously adjusting the time constant of both of said time-constant circuits so as to change the sensitive length of material which is recurrently tested, two averaging means connected to the outputs of the peak rectifier circuits respectively and to ground, to average said rectified portions independently, two similar impedances connected to the outputs of said averaging means, respectively, across each of which is established a potential corresponding to a respective one of said averaged rectified portions, said last-named potentials being of opposite sign, and vacuum-tube voltmeter means for measuring the difference between said last-named potentials.

11. A system adapted to evaluate continuously an electrical signal potential having unsymmetrical outward and inward peak fluctuations with respect to a mean, said fluctuations being subject to random variations in frequency of occurrence and said mean being subject to fluctuations, which includes first means for establishing from said fluctuations within a preselected time period peak voltage of one sign as a measure of outward peak fluctuation, second means for separately and independently establishing within the same time period peak voltage of opposite sign as a measure of inward peak fluctuation, and circuit means connected to the outputs of said first and second means, respectively, both having the same time constant, but said time constant being shorter than said time period, for separately and independently averaging said peak voltages, respectively, separate impedance means across which potentials of values representative of the averaged outward and inward peaks are respectively established, and means connected to symmetrical points on said impedances for measuring the absolute potential difference between said points, thereby to evalute the fluctuations of said outward and inward signal peaks.

References Cited in the file of this patent

UNITED STATES PATENTS

| 2,265,826 | Wheeler | Dec. 9, 1941 |
| 2,286,378 | Roberts | June 16, 1942 |
| 2,424,312 | Haynes | July 22, 1947 |
| 2,519,295 | Shepard | Aug. 15, 1950 |
| 2,571,650 | Atwood | Oct. 16, 1951 |
| 2,576,833 | Goodall | Nov. 27, 1951 |
| 2,620,439 | Dome | Dec. 2, 1952 |
| 2,694,181 | Lax | Nov. 9, 1954 |